(12) United States Patent
Pang et al.

(10) Patent No.: US 11,827,840 B2
(45) Date of Patent: *Nov. 28, 2023

(54) LONG-TERM HIGH-TEMPERATURE RESISTANT TOUGHENED SILICA-CEMENT COMPOSITE MATERIAL AND PREPARATION METHOD

(71) Applicant: China University of Petroleum (East China), Qingdao (CN)

(72) Inventors: Xueyu Pang, Qingdao (CN); Jiankun Qin, Qingdao (CN); Hailong Li, Qingdao (CN); Guodong Cheng, Qingdao (CN)

(73) Assignee: China University of Petroleum (East China), Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/151,408

(22) Filed: Jan. 6, 2023

(65) Prior Publication Data

US 2023/0279283 A1  Sep. 7, 2023

(30) Foreign Application Priority Data

Mar. 2, 2022 (CN) .......................... 202210203763.0

(51) Int. Cl.
| C09K 8/467 | (2006.01) |
| C04B 28/02 | (2006.01) |
| C04B 14/30 | (2006.01) |
| C04B 14/06 | (2006.01) |
| C04B 16/06 | (2006.01) |

(Continued)

(52) U.S. Cl.
CPC ............ *C09K 8/467* (2013.01); *C04B 14/026* (2013.01); *C04B 14/06* (2013.01); *C04B 14/303* (2013.01); *C04B 14/308* (2013.01); *C04B 16/0616* (2013.01); *C04B 28/02* (2013.01);

(Continued)

(58) Field of Classification Search
CPC ..... C09K 8/467; C04B 14/026; C04B 14/303; C04B 14/308; C04B 16/0616; C04B 28/02; C04B 2103/0027; C04B 2103/20; C04B 2111/28; E21B 33/13
See application file for complete search history.

(56) References Cited

FOREIGN PATENT DOCUMENTS

| CN | 104099071 A | 10/2014 |
| CN | 109679600 A | 4/2019 |

(Continued)

*Primary Examiner* — Crystal J. Lee
(74) *Attorney, Agent, or Firm* — Nitin Kaushik

(57) ABSTRACT

The present invention belongs to the technical field of oil well cement preparation, discloses a long-term high-temperature resistant and toughened well cementing and silica-cement composite material and a preparation method. A solid component comprises cement, alumina, superfine, high-purity silica sand, a suspending agent and a toughening material according to weight fractions; the toughening material comprises a latex fiber toughening agent and a nano graphene sheet; and a liquid component is composed of water, nano iron oxide and an oil well cement admixture according to weight fractions. Cement slurry with a ratio of the present invention can achieve compressive strength reaching up to 31 MPa after being cured under a high-temperature and high-pressure environment of 200° C. and 150 MPa for one year; and the gas permeability is controlled below 0.02 mD.

5 Claims, 9 Drawing Sheets

(51) Int. Cl.
*E21B 33/13* (2006.01)
*C04B 14/02* (2006.01)
*C04B 111/28* (2006.01)
*C04B 103/00* (2006.01)
*C04B 103/20* (2006.01)

(52) U.S. Cl.
CPC ...... *E21B 33/13* (2013.01); *C04B 2103/0027* (2013.01); *C04B 2103/20* (2013.01); *C04B 2111/28* (2013.01)

(56) References Cited

FOREIGN PATENT DOCUMENTS

| | | | |
|---|---|---|---|
| CN | 110257030 A | | 9/2019 |
| CN | 110484223 A | | 11/2019 |
| CN | 112408890 A | | 2/2021 |
| CN | 113582605 A | | 11/2021 |
| CN | 113773008 A | * | 12/2021 |
| CN | 113773008 A | | 12/2021 |
| JP | 2005097069 A | | 4/2005 |

* cited by examiner

LONG-TERM HIGH-TEMPERATURE RESISTANT TOUGHENED SILICA-CEMENT COMPOSITE MATERIAL AND PREPARATION METHOD

CROSS-REFERENCE TO RELATED APPLICATIONS

The application claims priority to Chinese patent application No. 2022102037630, filed on Mar. 2, 2022, the entire contents of which are incorporated herein by reference.

TECHNICAL FIELD

The present invention belongs to the technical field of oil well cement preparation, in particular to a long-term high-temperature resistant and toughened well cementing and silica-cement composite material and a preparation method.

BACKGROUND

At present, the exploitation of deep wells and ultra-deep wells has gradually become a main form of exploitation in emerging oil fields. Exploitation of the deep and ultra-deep wells always faces a complicated geological environment, and bad well and working conditions, while the "three ultra" problems, namely a high temperature, a high pressure and a high sulfur content, are obvious. The "three ultra" environment seriously affects stability of well cementing walls. If a cement sheath is exposed to the "three ultra" environment for a long time, the service life thereof will be greatly reduced, which will endanger oil field production safety and reduce economic benefits. In the "three ultra" problem, an ultra-high temperature downhole environment is often a main factor affecting well cementing quality. At 110° C., the strength of Portland cement which is most commonly used in well cementing engineering, declines; and amorphous C-S-H gel thereof is transformed into the dicalcium silicate hydrate ($\alpha$-$C_2SH$) crystal with poor performance. It is necessary to add silica sand into cement slurry to prevent the strength decline. For many years, it has been recognized that the optimum silica sand addition amount is 30%-40% of a cement mass. However, in a high-temperature environment (>150° C.), a Portland cement system with added silica sand will still show obvious microstructure coarsening (mainly manifested by grain coarsening, pore enlargement and reduction in a specific surface area of hydration products) and strength decline, especially for low-density cement slurry with a low solid phase volume fraction. The prior study shows that after 142 days, the strength of the optimized silica-enriched Portland cement will still decline seriously (up to 80%) under the condition of simulating high-temperature in-situ molding of deep well conditions, thereby seriously affecting the cementing effect of oil well cement; and the main decline factor is continuous shrinkage of the internal pore structure. Therefore, selection of suitable materials to fill internal pores of set cement can reduce the strength decline of set cement in a high-temperature and high-pressure environment to a certain extent. China patent document CN109679600A discloses a nano-material mixed modified ultra-high-temperature high-performance oil well cement system and a preparation method thereof. The system comprises the following components in parts by weight: 100 parts of oil well cement, 15-25 parts of coarse silica sand, 15-20 parts of fine silica sand, 1-10 parts of nano silica, 1-10 parts of nano calcium carbonate, 0.2-1 part of a defoamer, 4-10 parts of a fluid loss agent, 0-3 parts of a dispersant, 0.5-4 parts of a retarder and 30-100 parts of water. The set cement in the cement system of the present invention has excellent compressive strength and toughness under the condition of an ultra-high temperature, but the reduction ranges of Young's modulus within 28 days are all above 10%; and performance of the set cement has not been studied as for a period of more than 28 days. China patent document CN106833567A discloses a high-strength, high-toughness and high-temperature resistant oil well cement system, and a preparation method and a design method thereof. A reinforcing material comprises coarse silica sand, fine silica sand and nano silica. After being cured at 150° C. and 30 MPa for 28 days, the compressive strength of the cement system is kept above 60 MPa. However, the system is only suitable for the environment of 150° C., which cannot meet the need of preventing strength decline of set cement above 200° C.

A toughening material is widely used in oil well cement as an admixture that can increase deformability of set cement. Patent application CN112408890A discloses high-temperature resistant, toughening and anti-gas-channeling oil well cement slurry and a preparation method thereof. The prepared cement slurry has good fluidity and is suitable for field construction and application. However, only a 28-day sample of the set cement in an environment of 180° C. and 20 MPa was tested, the long-term strength in a high-temperature and high-pressure temperature was not tested. As a kind of nanomaterial, graphene has good chemical, mechanical, electrical, optical and thermal conduction performance. Many scholars have shown in the research that a graphene material can promote hydration crystals in cement-based composites to cross-link with each other so as to form a compact structure and improve the toughness of set cement, thereby significantly improving toughness of the cement-based material. Patent application CN112456869A discloses high-fracture resistant graphene oxide cement mortar, in which the weight of graphene oxide accounts for 0.01-0.05% of the total weight of a cementing material. It is proved that addition of the graphene oxide can improve toughness of set cement, but no test was made aiming at a high-temperature and high-pressure downhole environment. Moreover, there is rare research on graphene as a reinforcing agent which is used to solve the problem of strength decline of well cementing set cement in a high-temperature environment. Patent application CN110484223B discloses that a graphene emulsion with a solid phase content of 3%-5% is used as a reinforcing agent, which is added into a silica-enriched oil well cement system. However, the highest curing temperature of the present invention is only 180° C.; and long-term strength performance of set cement has not been studied. At present, there is no report on researches of graphene which is used to solve the long-term strength decline of high-temperature well cementing set cement.

Through the above analysis, existing problems and defects of the prior study are as follows:

(1) A condition of failure of wellbore integrity of oil and gas wells occurs from time to time.
(2) Long-term strength data of an existing cement system is missing.
(3) There is no method of applying graphene in a oil well cement system in the prior study.
(4) The prior study does not consider long-term stability of a Young's modulus of set cement.

The difficulties of solving the above problems and defects include:

(1) Long-term data of wellbore performance of oil and gas wells is difficult to obtain.

(2) It is difficult to prepare an autoclave which meets a high-temperature and high-pressure downhole environment; and it is difficult to simulate a downhole environment.

(3) It is difficult to solve the problem of continuity of long-term high-temperature and high-pressure set cement curing.

The significance of solving the above problems and defects is as follows:

(1) To ensure long-term stable production of oil and gas wells and save the drilling cost.

(2) To fully understand a long-term change mechanism of set cement under a high-temperature and high-pressure environment.

(3) To ensure stability of a Young's modulus of set cement and reduce casing damage caused by deformation of the set cement.

SUMMARY

Aiming at the problems existing in the prior art, the present invention provides a long-term high-temperature resistant and toughened well cementing and silica-cement composite material and a preparation method. The present invention particularly relates to a preparation method and a design method of a toughening system for improving a Young's modulus of well cementing set cement in an ultra-long-term, high-temperature and high-pressure environment. The purpose of the present invention is to enhance stability of formula performance of addition of a toughening material after 360 days of curing.

The present invention is implemented in this way: a long-term high-temperature resistant and toughened well cementing and silica-cement composite material, comprising a solid component and a liquid component, wherein the solid component is composed of 40-60% of cement, 3-8% of alumina, 30-50% of superfine high-purity silica sand, 1.5-2.1% of an additive and 2.2-6% of a toughening material according to weight fractions;

The liquid component is composed of 70-73% of water, 6-7% of nano iron oxide and 20-24% of an oil well cement admixture according to weight fractions.

Further, a weight ratio of the solid component to the liquid component is 1:0.3-0.6.

Further, wherein the cement is Class G oil well cement.

Further, wherein the $SiO_2$ content in the silica sand is larger than 97%; a median particle size of the silica sand is 5-20 μm; the purity of nano graphene sheet is over 99.5%; the thickness is 4-20 nm; and a particle size of a nano iron oxide suspension is 30 nm. Preferably, a particle size D90 of the silica sand is 19.72 μm.

Further, the toughening material is composed of 0.2-1% of a nano graphene sheet and 2-6% of a latex fiber toughening material according to weight fractions.

Further, the purity of the nano graphene sheet is over 99.5%.

Further, the latex fiber toughening material is a mixture of solidified latex and organic fibers.

Further, the additive comprises a retarder; and the additive further comprises at least one of a suspending agent, a dispersing agent, a fluid loss agent and a defoamer.

Another purpose of the present invention is to provide a preparation method of the long-term high-temperature resistant and toughened well cementing and silica-cement composite material, wherein the reparation method of the long-term high-temperature resistant and toughened well cementing and silica-cement composite material comprises the following steps:

Step 1, mixing cement, alumina, silica sand, a suspending agent and a toughening material according to a ratio to obtain a solid component;

Step 2, mixing water, nano iron oxide and an additive according to a ratio to obtain a liquid component; and Step 3, uniformly mixing the obtained solid component and liquid component according to proportions to obtain a high-temperature resistant oil well cement system.

Another purpose of the present invention is to provide application of the long-term high-temperature resistant and toughened well cementing and silica-cement composite material in oil well cementing.

According to all the above technical solutions, the present invention has the following advantages and positive effects:

A cement system of the present invention can alleviate the problem of strength decline of well cementing set cement in an ultra-high temperature environment. After curing in a high-temperature and high-pressure environment of 200° C. and 150 MPa for one year, the formula of adding the toughening material keeps the compressive strength above 25 MPa; and gas permeability is below 0.05 mD.

Compared with expensive graphene oxide and single-layer graphene, the graphene nano sheet added in the present invention has higher thickness, is easier to disperse in cement slurry, is cheaper in price, and is suitable for application in the field of well cementing.

According to the present invention, the alumina, silica sand, toughening material (a nano graphene sheet and latex fiber toughening material Flok-2) and nano iron oxide colloidal solution are compounded according to certain proportions with supplementation of the liquid component with a certain proportion to obtain a novel high-temperature resistant oil well cement system which can be applied to an ultra-high temperature environment. Under curing conditions of 200° C. and 150 MPa, the 360-day physical and mechanical performance thereof is tested respectively. Compared with other China patent documents CN109679600A and CN108485621A, the present invention pays attention to the long-term compressive strength, Young's modulus, permeability and other performance of set cement in the high-temperature and high-pressure environment. The Young's modulus of 360-day samples of the toughening system in the present invention are about 10 GPa; and the compressive strengths thereof are all over 25 MPa.

The technical achievements, design concepts and related technical solutions of the present invention have been applied on site in Keshen 9-3 well. The latex fiber toughening material Flok-2 is added into cement under the downhole condition of 166° C. to slow down the long-term strength decline caused by microstructure coarsening. According to production situations of 180 days after well cementing, there is no annular band pressure phenomenon in the well section of Keshen 9-3 well; and the set cement has complete sealing performance, shows no strength decline phenomenon, and is capable of maintaining long-term strength stability of the set cement.

The high-temperature resistant and toughened oil well cement system of the present invention can solve the problem of wellbore instability caused by modulus decline of set cement in the high-temperature and high-pressure environment, and lays a solid foundation for development of deep wells and ultra-deep wells.

DETAILED DESCRIPTION OF THE EMBODIMENTS

Aiming at the problems existing in the prior art, the present invention provides a long-term high-temperature resistant and toughened well cementing and silica-cement composite material and a preparation method thereof. The present invention will be described in detail below with reference to the accompanying drawings.

The long-term high-temperature resistant and toughened well cementing and silica-cement composite material provided by an embodiment of the present invention is composed of a solid component and a liquid component; the solid component is composed of 40-60% of cement, 3-8% of alumina, 30-50% of superfine high-purity silica sand, 1.5-2.1% of an additive, of a toughening nano graphene sheet and 2-6% of a toughening latex fiber toughening material according to weight fractions.

The liquid component is composed of 70-73% of water, 6-7% of nano iron oxide and of an oil well cement admixture according to weight fractions.

A weight ratio of the solid component to the liquid component provided by an embodiment of the present invention is 1:0.3-0.6.

The cement provided by an embodiment of the present invention is Class G oil well cement.

The $SiO_2$ content in the silica sand provided by an embodiment of the present invention is larger than 97%; a median particle size of the silica sand is 5-20 μm; the purity of nano graphene sheet is over 99.5%; the thickness is 4-20 nm; and a particle size of a nano iron oxide suspension is 30 nm. Preferably, a particle size D90 of the silica sand is 19.74 μm.

The toughening material provided by an embodiment of the present invention is composed of 0.2-1% of a nano graphene sheet and 2-6% of a latex fiber toughening material according to weight fractions.

The purity of nano graphene sheet provided by an embodiment of the present invention is over 99.5%.

The latex fiber toughening material provided by an embodiment of the present invention is a mixture of solidified latex and organic fibers.

The additive provided by an embodiment of the present invention comprises a retarder; and the additive further comprises at least one of a suspending agent, a dispersing agent, a fluid loss agent and a defoamer.

Figure 1:
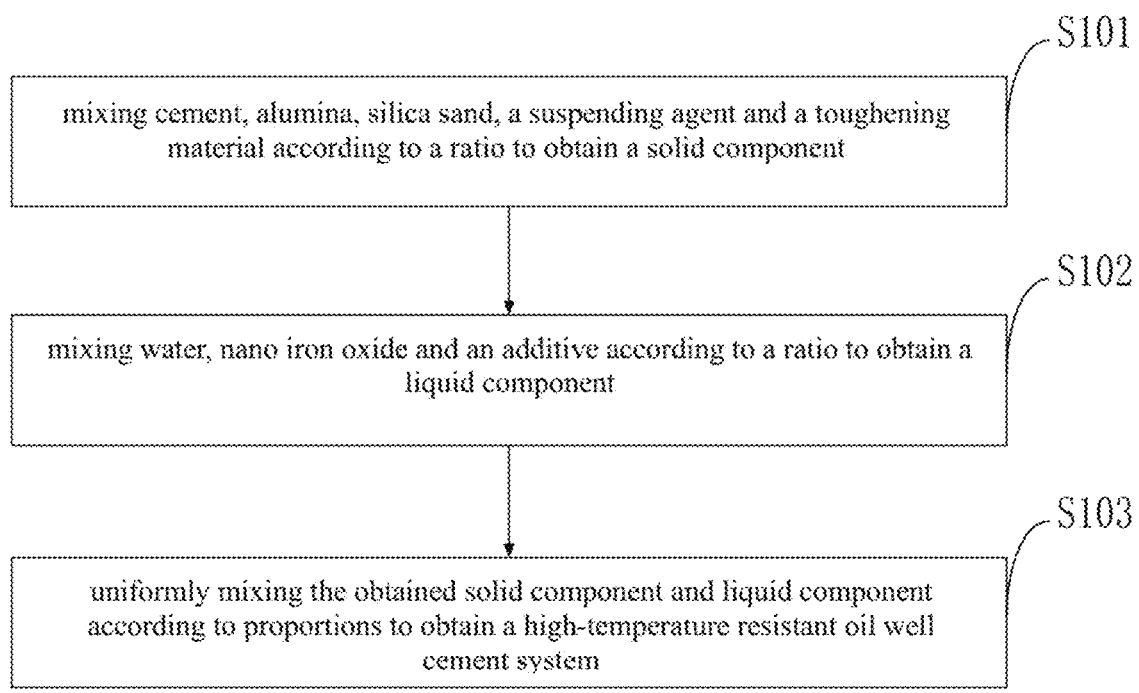
FIG. 1 is a flow chart of a preparation method of a long-term high-temperature resistant and toughened well cementing and silica-cement composite material provided by an embodiment of the present invention.

As shown in FIG. 1, the preparation method of the long-term high-temperature resistant and toughened well cementing and silica-cement composite material provided by an embodiment of the present invention comprises:

S101, mixing cement, alumina, silica sand, a suspending agent and a toughening material according to a ratio to obtain a solid component.

S102, mixing water, nano iron oxide and an additive according to a ratio to obtain a liquid component; and S103, uniformly mixing the obtained solid component and liquid component according to proportions to obtain a high-temperature resistant oil well cement system.

In the present invention, a weight ratio of the solid component to the liquid component may be 1:0.3, 1:0.35, 1:0.4, 1:0.45, 1:0.5, 1:0.55 or 1:0.6.

In a preferred implementation, the solid component comprises, by weight, 40-60% of cement, 3-8% of alumina, 30-50% of silica sand, and 1.5-2.1% of a suspending agent and a toughening material; and the toughening material comprises, by weight, 0.2-1% of a nano graphene sheet and 2-6% of a latex fiber toughening material.

In a specific implementation, the content of cement in the solid component may be 40%, 45%, 50%, 55% or 60% by weight; the content of alumina in the solid component may be 3%, 4%, 5%, 6%, 7% or 8% by weight; the content of silica sand in the solid component may be 30%, 35%, 40%, 45% or 50% by weight; the content of nano graphene sheet in the solid component may be 0.2%, 0.3%, 0.4%, 0.5%, 0.6%, 0.7%, 0.8%, 0.9% or 1% by weight; and the content of latex fiber toughening material in the solid component may be 2%, 2.5%, 3%, 3.5%, 4%, 4.5%, 5%, 5.5% or 6% by weight.

In a preferred implementation, the cement is Class G oil well cement. In a specific implementation, Class G oil well cement comprises, by weight, 65.13% of CaO, 18.45% of $SiO_2$ and 2.99% of $Al_2O_3$.

In a preferred implementation, the content of $SiO_2$ in the silica sand is over 97% of the weight.

Preferably, a particle size D90 of silica sand is 19.3-52 μm. Specifically, the particle size D90 of silica sand may be 19.3 μm, 20 μm, 25 μm, 30 μm, 35 μm, 40 μm, 45 μm, 50 μm or 52 μm.

In a specific implementation, the silica sand is conventional silica sand used for oil well cement, with the particle size D90 of 163 μm.

In a preferred implementation, the particle size thickness of the nano graphene sheet is 4-20 nm; the micro-film size is 5-10 μm; and the number of layers is less than 20.

In a preferred implementation, the latex fiber toughening material is of model Flok-2 produced by OMAX Oilfield Technology Co., Ltd. (Chengdu), which is a mixture of solidified latex and organic fibers.

In a preferred implementation, a content of a nano iron oxide suspension, by weight, is 30%; an average particle size is 30 nm; and a specific surface area is 20-60 m2/g.

In a preferred implementation, the additive comprises a retarder. Further preferably, the additive further comprises at least one of a suspending agent, a dispersing agent, a fluid loss agent and a defoamer.

In the present invention, most additives are polymers, which can be of a solid phase or a liquid phase. The phase is mainly determined by various slurry properties such as cement slurry density, rheology, thickening, water loss, etc. In general, adjustments should be made according to working conditions in actual engineering application.

In a specific implementation, the additive may be obtained through commercially available manners.

In a preferred implementation, the liquid component comprises, by weight, 70-90% of water and 10-30% of the additive.

A second aspect of the present invention provides a preparation method of the high-temperature resistant oil well cement system, which comprises the following steps:
(1) mixing cement, silica sand and other admixture according to a ratio to obtain a solid component;
(2) mixing water and an additive according to a ratio to obtain a liquid component; and
(3) mixing the solid component obtained in step (1) and the liquid component obtained in step (2) according to a ratio to obtain a high-temperature resistant oil well cement system.

In a preferred implementation, in step (3), the mixing is mixing by stirring.

In a preferred implementation, a specific process of step (3) is as follows: adding the liquid component obtained in step (2) into a mold, then adding the solid component obtained in step (1) into the liquid component under stirring, and mixing by stirring after the addition.

The present invention will be further illustrated with reference to reference examples and test examples.

The additives used in specific embodiments of the present invention are all from CNPC Boxing Company, wherein the suspending agent model is BCJ-300L; the dispersing agent model is BCD-210L; the retarder model is BCR-300L; the fluid loss agent model is BXF-200L; and the defoamer model is G603.

Embodiment 1

A high-temperature resistant oil well cement system is composed of a solid component and a liquid component; and a weight ratio of the solid component to the liquid component is 1:0.44.

Wherein the solid component comprises, by weight, 54.1% of Class G oil well cement (main chemical components: CaO: 65.13% by weight, $SiO_2$: 18.45% by weight, and $Al_2O_3$: 2.99% by weight), 37.8% of silica sand (D90=19.2 μm) and 8.1% of alumina;

The liquid component comprises, by weight, 69.2% of water, 4.8% of a suspending agent, 6.0% of nano iron oxide, 6.6% of a dispersing agent, 5.4% of a retarder, 7.2% of a fluid loss agent and 0.6% of a defoamer.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Embodiment 2

A high-temperature resistant oil well cement system is composed of a solid component and a liquid component; and a weight ratio of the solid component to the liquid component is 1:0.43.

Wherein the solid component comprises, by weight, 52.4% of Class G oil well cement (main chemical components: CaO: 65.13% by weight, $SiO_2$: 18.45% by weight, and $Al_2O_3$: 2.99% by weight), 36.6% of silica sand (D90=19.2 μm), 7.9% of alumina and 3.1% of a latex fiber toughening material;

The liquid component comprises, by weight, 69.2% of water, 4.8% of a suspending agent, 6.0% of nano iron oxide, 6.6% of a dispersing agent, 5.4% of a retarder, 7.2% of a fluid loss agent and 0.6% of a defoamer.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Embodiment 3

A high-temperature resistant oil well cement system is composed of a solid component and a liquid component; and a weight ratio of the solid component to the liquid component is 1:0.44.

Wherein the solid component comprises, by weight, 53.9% of Class G oil well cement (main chemical components: CaO: 65.13% by weight, $SiO_2$: 18.45% by weight, and $Al_2O_3$: 2.99% by weight), 37.8% of silica sand (D90=163 μm), 8.1% of alumina and 0.2% of a nano graphene sheet.

The liquid component comprises, by weight, 68.7% of water, 4.9% of a suspending agent, 6.1% of nano iron oxide, 6.8% of a dispersing agent, 5.5% of a retarder, 7.4% of a fluid loss agent and 0.6% of a defoamer.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Embodiment 4

A long-term high-temperature resistant and toughened well cementing and silica-cement composite material provided by an embodiment of the present invention is composed of a solid component and a liquid component; and a weight ratio of the solid component to the liquid component is 1:0.3, 1:0.35, 1:0.4, 1:0.45, 1:0.5, 1:0.55 or 1:0.6.

The solid component is composed of 40% of cement, 8% of alumina, 44% of superfine high-purity silica sand, 2% of an additive and 6% of a toughening material according to weight fractions.

The liquid component is composed of 70% of water, 6% of nano iron oxide and 24% of an oil well cement admixture according to weight fractions.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Embodiment 5

A long-term high-temperature resistant and toughened well cementing and silica-cement composite material provided by an embodiment of the present invention is composed of a solid component and a liquid component; and a weight ratio of the solid component to the liquid component is 1:0.3, 1:0.35, 1:0.4, 1:0.45, 1:0.5, 1:0.55 or 1:0.6.

The solid component is composed of 60% of cement, 5% of alumina, 30.7% of superfine high-purity silica sand, 2.1% of an additive and 2.1% of a latex fiber toughening material according to weight fractions.

The liquid component is composed of 72% of water, 6.5% of nano iron oxide and 21.5% of an oil well cement admixture according to weight fractions.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Embodiment 6

A long-term high-temperature resistant and toughened well cementing and silica-cement composite material provided by an embodiment of the present invention is composed of a solid component and a liquid component; and a weight ratio of the solid component to the liquid component is 1:0.3, 1:0.35, 1:0.4, 1:0.45, 1:0.5, 1:0.55 or 1:0.6.

The solid component is composed of 55% of cement, 8% of alumina, 30.5% of superfine high-purity silica sand, 1.5% of an additive and 0.4% of a nano graphene sheet according to weight fractions.

The liquid component is composed of 70% of water, 7% of nano iron oxide and 23% of an oil well cement admixture according to weight fractions.

A preparation process is as follows:
(1) mixing cement, silica sand and other admixture according to a ratio to obtain a solid component;
(2) mixing water and an additive according to a ratio to obtain a liquid component; and
(3) adding the liquid component obtained in step (2) into a mold, then adding the solid component obtained in step (1) into the liquid component under a stirring speed of 4000 rpm, and stirring for 35 s under a speed of 12000 rpm after the addition.

Reference Example 1

Implementation is carried out according to the method of embodiment 1, but the difference is that: composition of the liquid component is different. The liquid component does not comprise nano iron oxide. The liquid component comprises, by weight, 74.7% of water, 4.9% of a suspending agent, 6.8% of a dispersing agent, 5.6% of a retarder, 7.4% of a fluid loss agent and 0.6% of a defoamer.

Test Example 1

Figure 2:
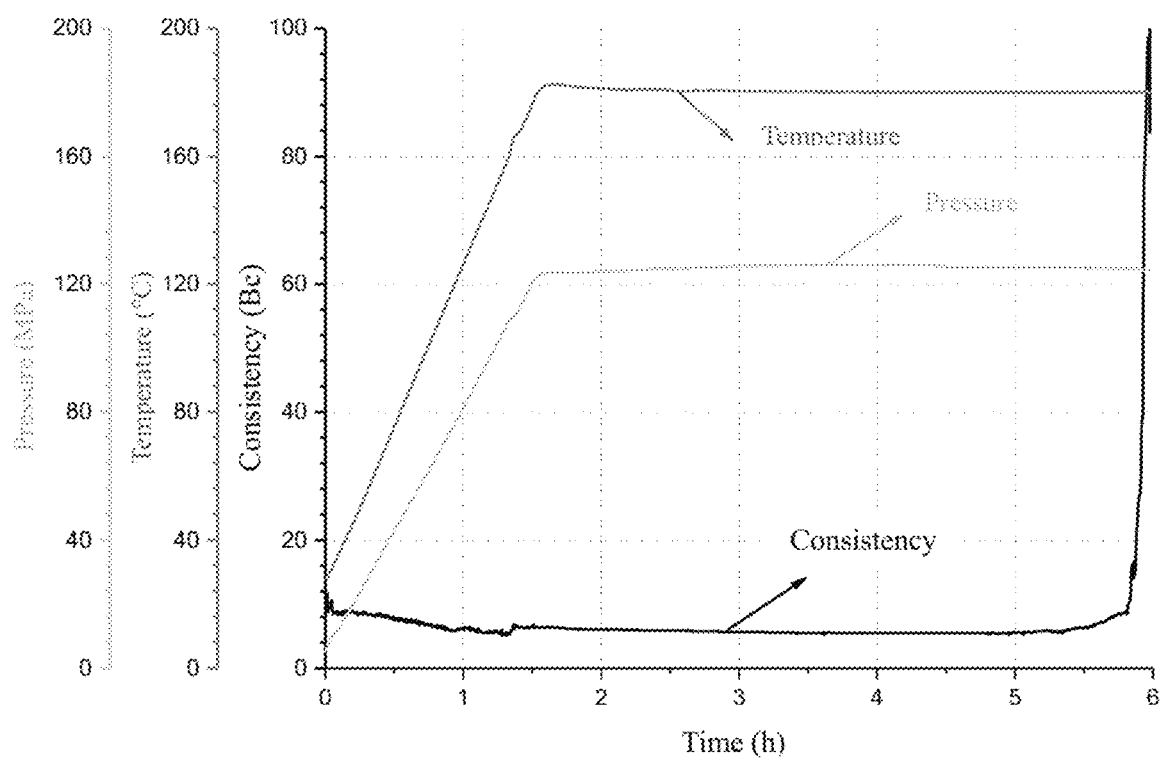
FIG. 2 is a thickening time diagram of a cement system provided by an embodiment of the present invention.

A thickening time diagram of the cement system in embodiment 1 under the condition of 180° C. and 120 MPa is shown in FIG. 2. It can be seen from the diagram that the thickening time of the system under a high temperature and a high pressure can exceed 5 h; and the heating-up time of the formula during curing is about 2 h, indicating that the system is still in a fluid state after reaching a target temperature and a target pressure, which meets conditions of high-temperature and high-pressure molding.

Test Example 2

Figure 3:
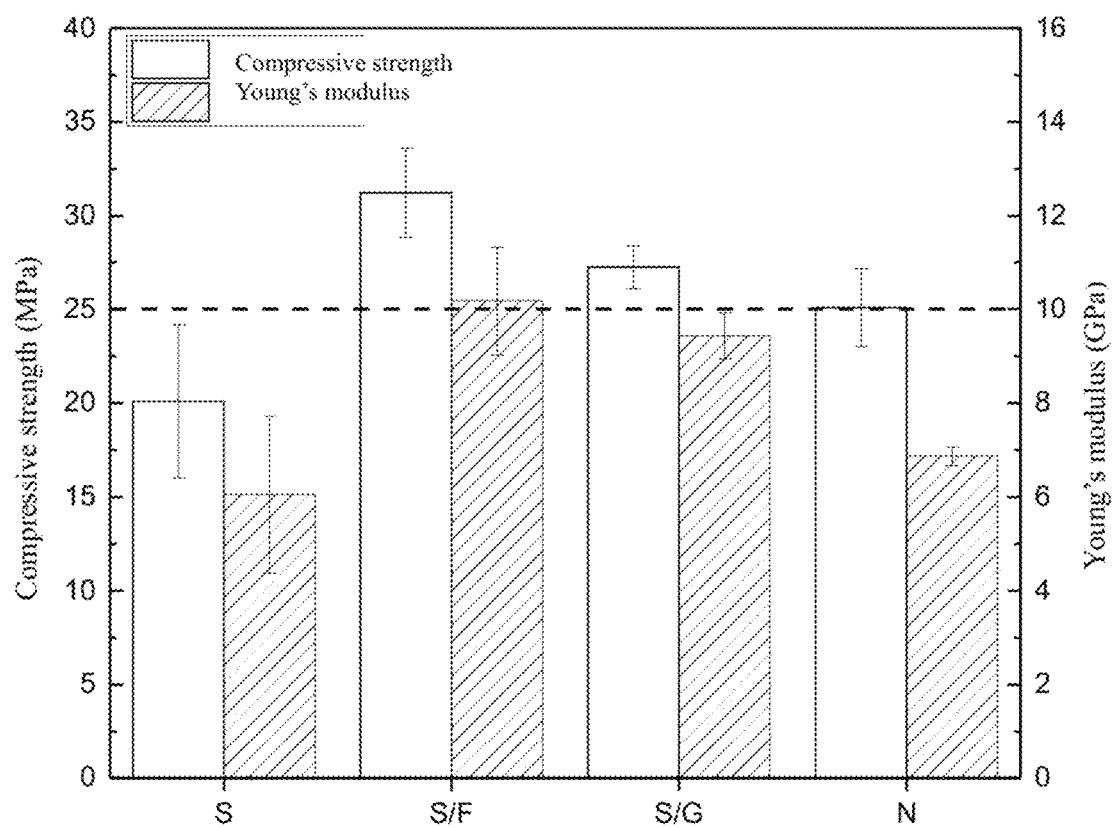
FIG. 3 is a schematic diagram of detection results of compressive strength and a Young's modulus of a cement system provided by an embodiment of the present invention.

The oil well cement systems of embodiments 1-3 and reference example 1 are cured in situ under the condition of 200° C. and 150 MPa for 360 days; and the compressive strength and Young's modulus of each system are detected. The results are shown in FIG. 3, wherein the results of embodiments 1-3 and reference example 1 correspond to S, S/F, S/G and N in the diagram, respectively.

It can be seen from the diagram that the compressive strength and Young's modulus of the 360-day-old sample of the oil well cement system with addition of the toughening material (formulas S/F and S/G) are obviously higher than those of other formulas. Specifically, after 360 days, the compressive strength of the formula with addition of the latex fiber toughening material can still remain above 30 MPa; and the Young's modulus remains about 10 GPa.

Test Example 3

Figure 4:
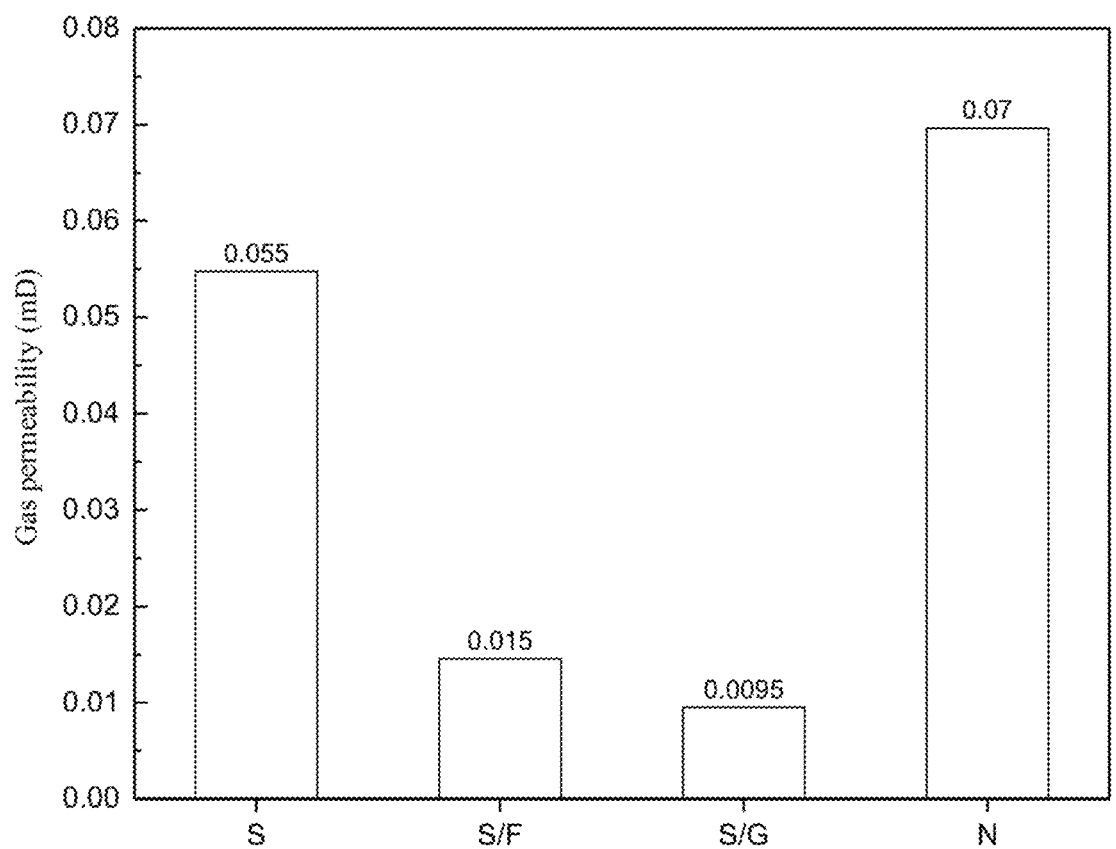
FIG. 4 is a schematic diagram of detection results of gas permeability of a cement system provided by an embodiment of the present invention.

The oil well cement systems of embodiments 1-3 and reference example 1 are cured in situ under the condition of 200° C. and 150 MPa for 360 days; and the gas permeability of each system is detected. The results are shown in FIG. 4, wherein the results of embodiments 1-3 and reference example 1 correspond to S, S/F, S/G and N in the diagram, respectively.

It can be seen from the diagram that the gas permeability of the 360-day-old sample with addition of the toughening material is obviously lower than that of other formulas, wherein the formula S/G with addition of the nano graphene material has the best performance; and the lowest gas permeability is only 0.0095 mD.

Test Example 4

Figure 5:
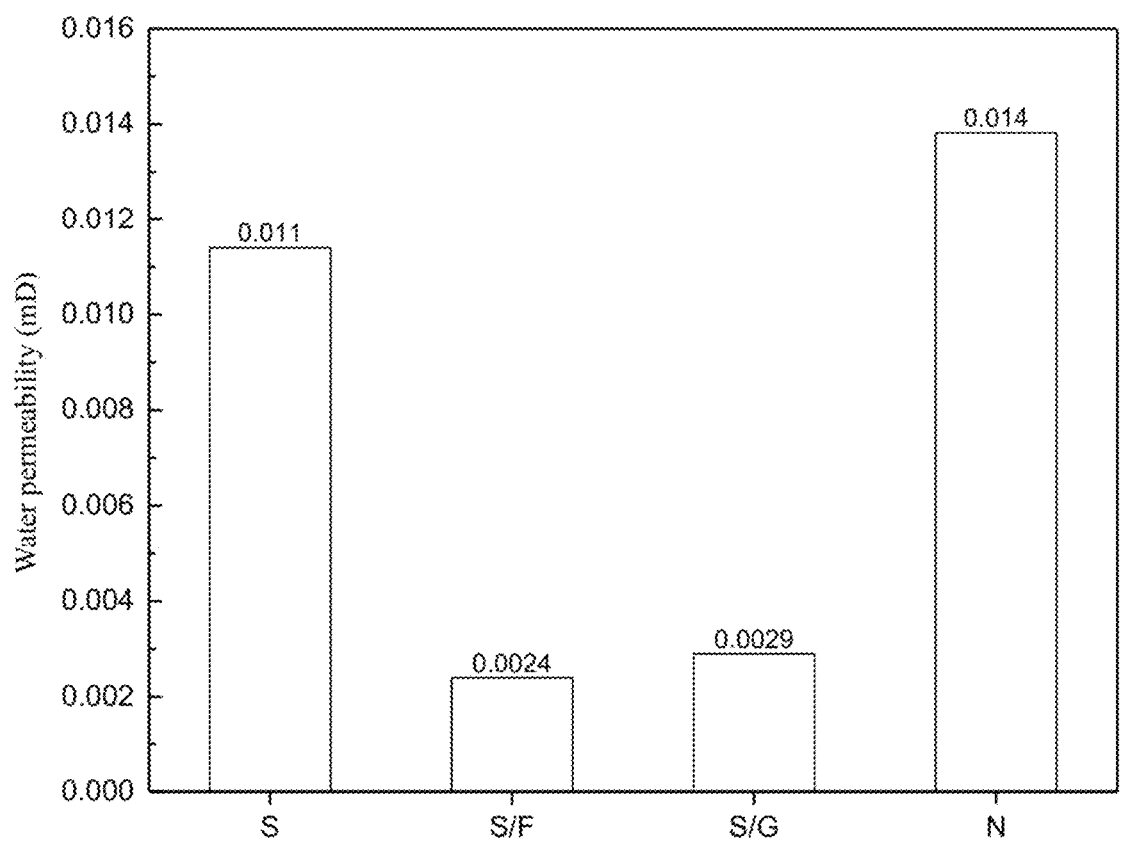
FIG. 5 is a schematic diagram of detection results of water permeability of a cement system provided by an embodiment of the present invention.

The oil well cement systems of embodiments 1-3 and reference example 1 are cured in situ under the condition of 200° C. and 150 MPa for 360 days; and the water permeability of each system is detected. The results are shown in FIG. 5, wherein the results of embodiments 1-3 and reference example 1 correspond to S, S/F, S/G and N in the diagram, respectively.

It can be seen from the diagram that the water permeability of the 360-day-old sample with addition of the toughening material is obviously lower than that of other formulas, wherein the formula S/F with addition of the latex fiber toughening material has the best performance; and the lowest water permeability is only 0.0024 mD.

Test Example 5

The oil well cement systems of embodiments 1-3 and reference example 1 are cured in situ under the condition of 200° C. and 150 MPa for 360 days; and an XRD diffraction map and mineral composition of each system are analyzed. The results are shown in FIG. 6, wherein the results of embodiments 1-3 and reference example 1 correspond to S, S/F, S/G and N in the diagram, respectively.

Figure 6:
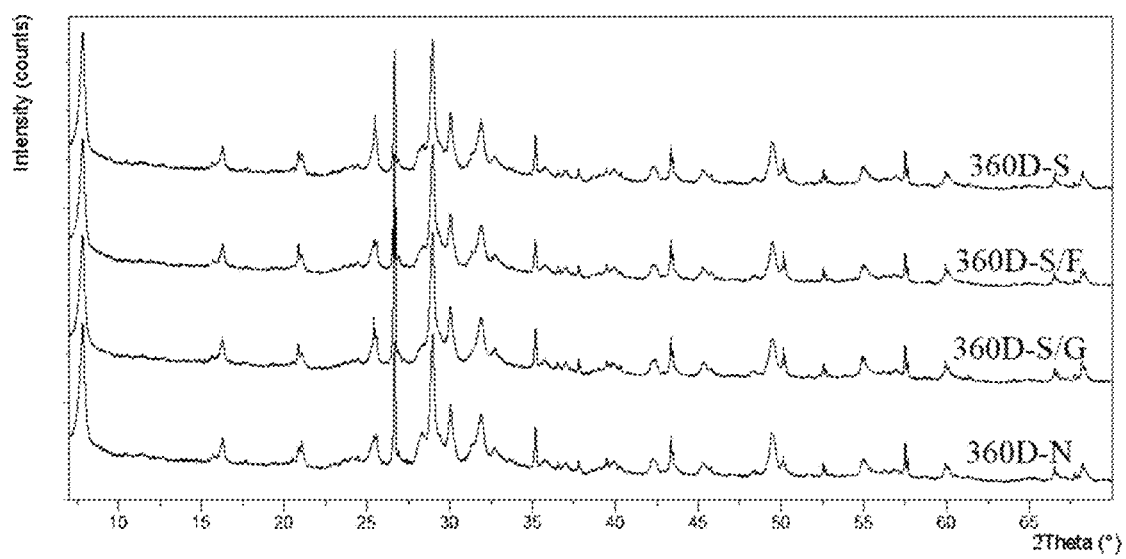
FIG. 6 is a schematic diagram of an XRD diffraction map of a cement system provided by an embodiment of the present invention.

It can be seen from FIG. 6 that, according to the XRD maps of different formulas with the same curing time, the mineral composition of each formula is basically the same (that is, the XRD diffraction map has little changes based on the formula). The result indicates that the addition of the toughening material does not influence formation of hydration products, but long-term stability of set cement is improved by filling internal pores of the set cement.

Test Example 6

The oil well cement systems of embodiments 1-3 and reference example 1 are cured in situ under the condition of 200° C. and 150 MPa for 360 days; and the distribution of mercury injection pore throat diameters of each system is analyzed. The results are shown in FIG. 7, wherein the results of embodiments 1-3 correspond to S, S/F and S/G in cumulative distribution rates in FIG. 7(*a*) and volume distribution rates in FIG. 7(*b*), respectively.

Figure 7A:
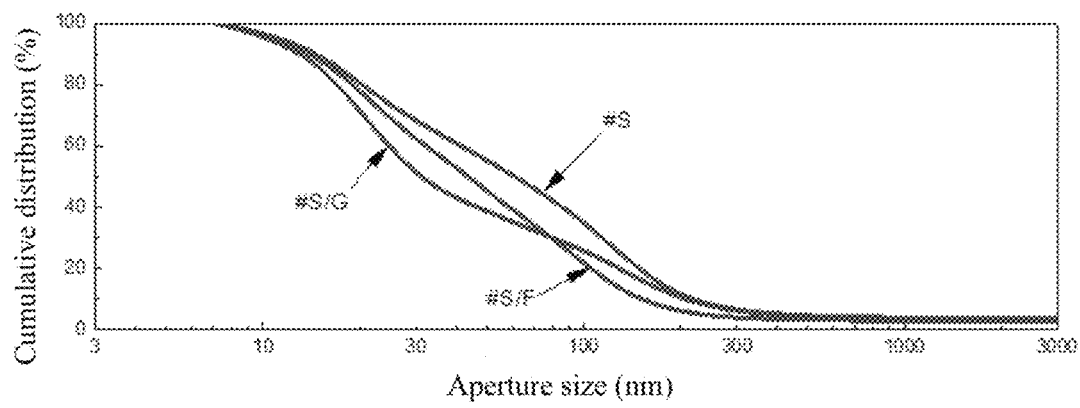
FIG. 7(a) is a schematic diagram of a cumulative distribution rate of distribution of mercury injection pore throat diameters of a cement system provided by an embodiment of the present invention.
Figure 7B:
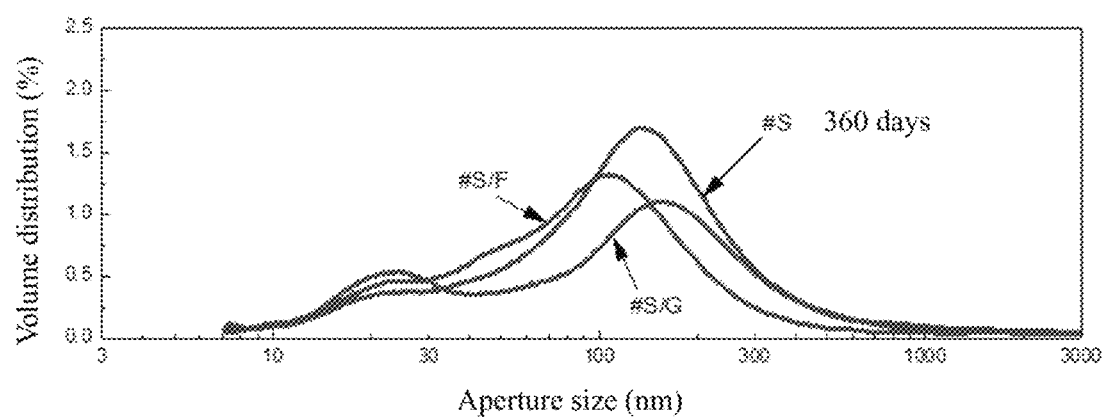
FIG. 7(b) shows S, S/F and S/G in volume distribution rates.

It can be seen from FIG. 7(*a*)-FIG. 7(*b*) that the internal pore throat diameter of the formula S/F with addition of the toughening material is obviously smaller than that of the formula without addition, indicating that the toughening material plays a role in reducing internal pores of set cement.

Test Example 7

Figure 8:
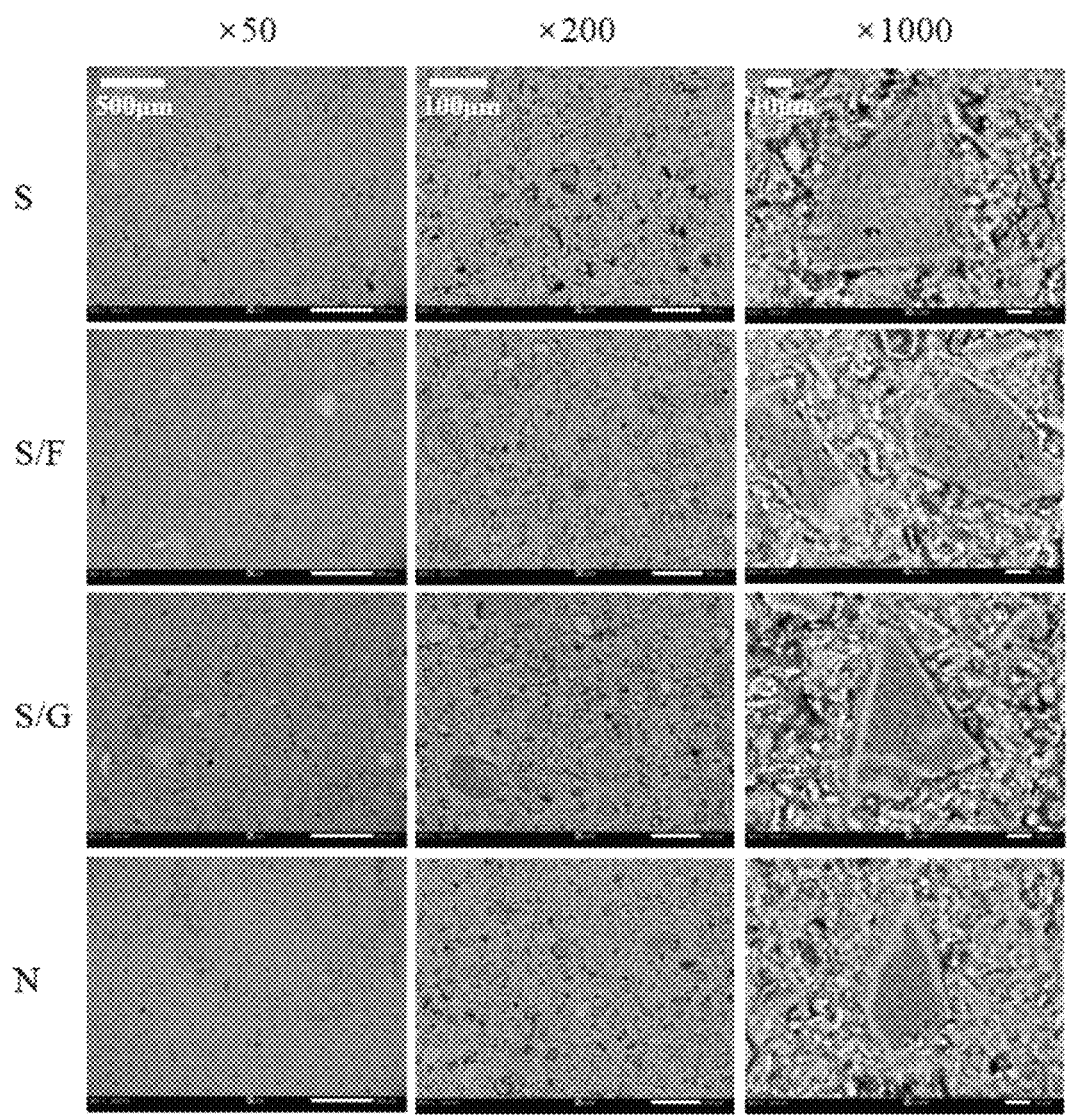
FIG. 8 is an electron microscope diagram of three magnifications (50 times, 200 times and 1000 times) of a cement system provided by an embodiment of the present invention.

The oil well cement systems of embodiments 1-3 and reference example 1 are cured in situ under the condition of 200° C. and 150 MPa for 2 days and 360 days, respectively; and electron microscope analysis is made on microstructures of the 360-day samples. The results are shown in FIG. 8, wherein the results of embodiments 1-3 and reference example 1 correspond to S, S/F, S/G and N in the diagram, respectively.

It can be seen from the diagram that there are still non-hydrated silica sand particles after curing for 360 days; and the microstructure of formula S/F with addition of the toughening material Flok-2 is denser.

Test Example 8

After curing of the samples of the embodiments to a specified age, the samples are naturally cooled to a room temperature from the condition of 200° C. and 150 MPa; and the compressive strength, Young's modulus, water permeability and gas permeability of the 360-day samples are detected. After curing of the sample of the reference example to a specified age, the sample is naturally cooled to a room temperature from the condition of 200° C. and 150 MPa; and the compressive strength, Young's modulus, water permeability and gas permeability of the 360-day sample are detected. The results are shown in Table 1.

TABLE 1

| No. | 360-day compressive strength/ MPa | 360-day Young's modulus/ GPa | 360-day water permeability/ mD | 360-day gas permeability/ mD |
| --- | --- | --- | --- | --- |
| Embodiment 1 | 20.1 | 6.05 | 0.0114 | 0.0548 |
| Embodiment 2 | 31.2 | 10.18 | 0.0024 | 0.0146 |
| Embodiment 3 | 27.2 | 9.43 | 0.0029 | 0.0095 |
| Reference example 1 | 25.1 | 6.93 | 0.0034 | 0.0190 |

It can be seen from Table 1, the strength of the 360-day-old sample of the formula of oil well cement system with addition of the toughening material in the present invention is obviously higher. In addition, the gas permeability and the water permeability of the 360-day sample are lower, indicating that the toughened oil well cement system in the present invention has excellent long-term high-temperature resistant performance and can meet the long-term sealing and isolation requirements of well cementing.

The above content only involves the specific implementations of the present invention, but the scope of protection of the present invention is not limited to this. In the technical scope disclosed by the present invention, any modification, equivalent substitution, improvement, etc. made within the spirit and principle of the present invention by anyone of skill familiar with the technical field should be covered in the scope of protection of the present invention.

What is claimed is:

1. A long-term high-temperature resistant and toughened well cementing and silica-cement composite material, comprising a solid component and a liquid component, wherein the solid component is composed of 40-60% of cement, 3-8% of alumina, 30-50% of superfine silica sand, 1.5-2.1% of an additive and 2.2-6% of a toughening material according to weight fractions;
the liquid component is composed of 70-73% of water, 6-7% of nano iron oxide and 20-24% of an oil well cement admixture according to weight fractions;
a weight ratio of the solid component to the liquid component is 1:0.3-0.6;
the toughening material is composed of 0.2-1% of a nano graphene sheet and 2-6% of a latex fiber toughening material according to weight fractions;
the latex fiber toughening material is a mixture of solidified latex and organic fibers; and
a $SiO_2$ content in the silica sand is larger than 97%; a median particle size of the silica sand is 5-20 μm; the purity of the nano graphene sheet is over 99.5%; the thickness of the nano graphene sheet is 4-20 nm; and a particle size of a nano iron oxide suspension is 30 nm.

2. The long-term high-temperature resistant and toughened well cementing and silica-cement composite material according to claim 1, wherein the cement is Class G oil well cement.

3. The long-term high-temperature resistant and toughened well cementing and silica-cement composite material according to claim 1, wherein the additive comprises a retarder; and the additive further comprises at least one of a suspending agent, a dispersing agent, a fluid loss agent and a defoamer.

4. A preparation method of the long-term high-temperature resistant and toughened well cementing and silica-cement composite material according to claim 1, wherein the preparation method of the long-term high-temperature resistant and toughened well cementing and silica-cement composite material comprises:
- step 1, mixing cement, alumina, silica sand, a suspending agent and a toughening material according to a ratio to obtain a solid component;
- step 2, mixing water, nano iron oxide and an additive according to a ratio to obtain a liquid component; and
- step 3, uniformly mixing the obtained solid component and liquid component according to proportions to obtain a high-temperature resistant oil well cement system.

5. An application of the long-term high-temperature resistant and toughened well cementing and silica-cement composite material according to claim 1 in oil well cementing.

* * * * *